(12) United States Patent
Hsu et al.

(10) Patent No.: US 12,224,485 B2
(45) Date of Patent: Feb. 11, 2025

(54) MICROMINIATURIZED ANTENNA FEED MODULE AND ELECTRONIC DEVICE USING THE SAME

(71) Applicant: FIH CO., LTD., New Taipei (TW)

(72) Inventors: Cho-Kang Hsu, New Taipei (TW);
Min-Hui Ho, New Taipei (TW);
Wei-Cheng Su, New Taipei (TW);
Yen-Hui Lin, New Taipei (TW)

(73) Assignee: FIH CO., LTD., New Taipei (TW)

( * ) Notice: Subject to any disclaimer, the term of this patent is extended or adjusted under 35 U.S.C. 154(b) by 351 days.

(21) Appl. No.: 17/828,328

(22) Filed: May 31, 2022

(65) Prior Publication Data

US 2023/0361450 A1    Nov. 9, 2023

(30) Foreign Application Priority Data

May 7, 2022    (CN) .......................... 202210490827.X

(51) Int. Cl.
*H01Q 1/24*    (2006.01)
*H04B 1/00*    (2006.01)

(52) U.S. Cl.
CPC ............. *H01Q 1/243* (2013.01); *H04B 1/006* (2013.01)

(58) Field of Classification Search
CPC .............................. H01Q 1/243; H04B 1/006
See application file for complete search history.

(56) References Cited

U.S. PATENT DOCUMENTS

| 10,218,071 B2* | 2/2019 | Toyao ...................... H01Q 7/00 |
| 2019/0173500 A1* | 6/2019 | Artemenko ............ H01Q 1/247 |
| 2021/0376452 A1* | 12/2021 | Wu ......................... H01Q 5/321 |

FOREIGN PATENT DOCUMENTS

| CN | 110854507 A | 2/2020 |
| TW | 201902029 A | 1/2019 |
| TW | 202030924 A | 8/2020 |

* cited by examiner

*Primary Examiner* — Henry Luong
(74) *Attorney, Agent, or Firm* — ScienBiziP, P.C.

(57) ABSTRACT

A microminiaturized antenna feed module includes a substrate, a plurality of coupled feed portions, and an active circuit. The substrate defines a plurality of visa penetrating the substrate. The coupled feed portions, made of conductive material and have different coupling areas, are electrically connected to the active circuit through the holes, to feed in electrical signals, the coupled feed portions couple the electrical signals to the metal frame to radiate wireless signals; the active circuit controls the switching of radiation modes of the metal frame. The application also provides an electronic device with the microminiaturized antenna feed module.

18 Claims, 12 Drawing Sheets

MICROMINIATURIZED ANTENNA FEED MODULE AND ELECTRONIC DEVICE USING THE SAME

CROSS-REFERENCE TO RELATED APPLICATIONS

This application claims priority to Chinese Patent Application No. 202210490827.X filed on May 5, 2022, in China National Intellectual Property Administration, the contents of which are incorporated by reference herein.

TECHNICAL FIELD

The present disclosure relates to the field of wireless communications, in particular to a microminiaturized antenna feed module and an electronic device using the same.

BACKGROUND

Mobile phones continue to grow thinner and lighter and faster and with more efficient data transmission. The space that can receive antennas is getting smaller and smaller, and with the continuous development of wireless communication technology, the demand for antenna bandwidth continues to increase. Making an antenna with a wider bandwidth and better efficiency in a limited space is challenging.

Therefore, there is a room for improvement.

DETAILED DESCRIPTION

Figure 1:
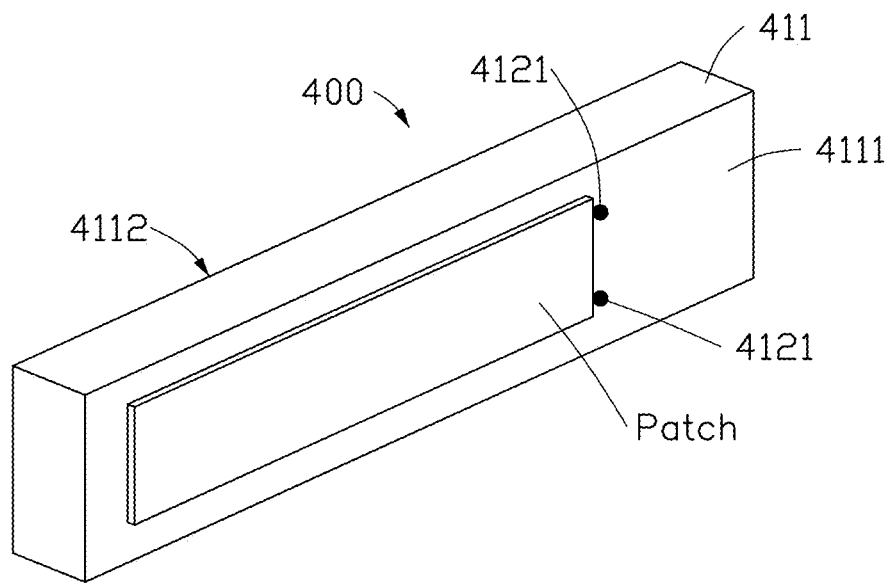
FIG. 1 is a schematic diagram of a microminiaturized antenna feed module of an embodiment of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure. Based on the embodiments of the present disclosure, all other embodiments obtained by those of ordinary skill in the art without creative work shall fall within the scope of protection of the present disclosure.

Those skilled in the art should understand that, in the disclosure of the present disclosure, "at least one" refers to one or more, and multiple refers to two or more. Unless otherwise defined, all technical and scientific terms used herein have the same meaning as commonly understood by those skilled in the technical field in the present disclosure. The terminology used in the specification of present disclosure is only for the purpose of describing specific embodiments, and is not intended to limit the present disclosure.

It can be understood that, unless otherwise specified in the present disclosure, "/" means "or". For example, "A/B" can mean A or B. "A and/or B" in the present disclosure is only a relationship describing the associated objects, which means that there can be three relationships: only A, only B, and A and B.

It can be understood that, in the disclosure of the present disclosure, the words such as "first" and "second" are only used for the purpose of distinguishing descriptions, and cannot be understood as indicating or implying relative importance, nor as indicating or implying order. The features defined as "first" and "second" of an element may explicitly or implicitly include one or more of the features. In the description of the embodiments of the present disclosure, the words such as "exemplary" or "for example" are used as examples, illustrations, or illustrations. Any embodiment or design solution described as "exemplary" or "for example" in the embodiments of the present disclosure should not be construed as being more preferable or advantageous than other embodiments or design solutions. Words such as "exemplary" or "for example" are merely used to present related concepts in a specific manner.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which is only for the convenience of describing the present disclosure and to simplify the description, rather than indicating or implying that the device or element referred to must have a specific orientation, or be constructed and operated in a specific orientation, so the above terms should not be understood as limiting the present disclosure.

Figure 2:
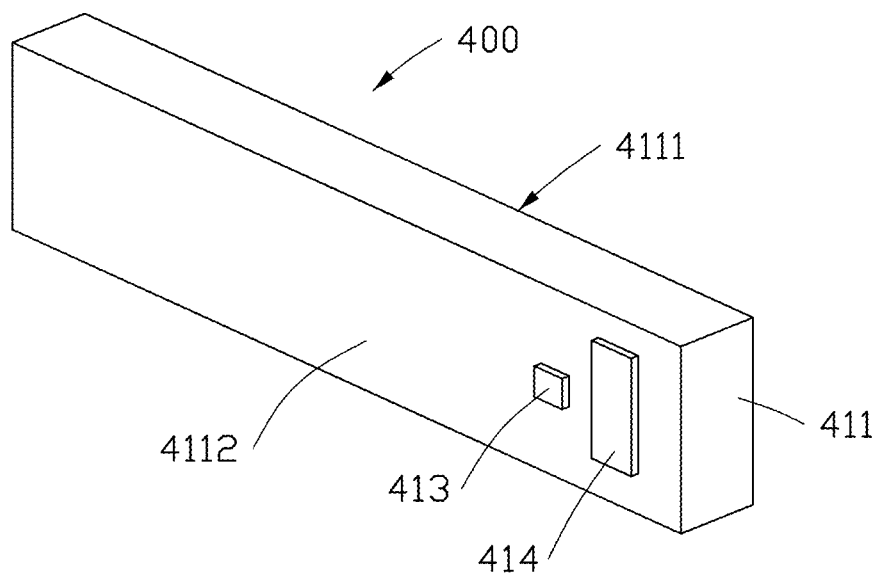
FIG. 2 is a schematic diagram of the microminiaturized antenna feed module shown in FIG. 1 from another angle.

FIGS. 1 and 2 illustrate a microminiaturized antenna feed module 400 in accordance with an embodiment of the present disclosure. The microminiaturized antenna feed module 400 includes a substrate 411, a plurality of coupled feed portions Patch, an active circuit 413 (shown in FIG. 2), and a connector 414 (shown in FIG. 2).

The substrate 411 may be a dielectric substrate, for example, a printed circuit board (PCB), a ceramic substrate or other dielectric substrate, which is not specifically limited herein. The substrate 411 includes a first surface 4111 and a second surface 4112, and the second surface 4112 is disposed opposite to the first surface 4111.

Figure 3A:
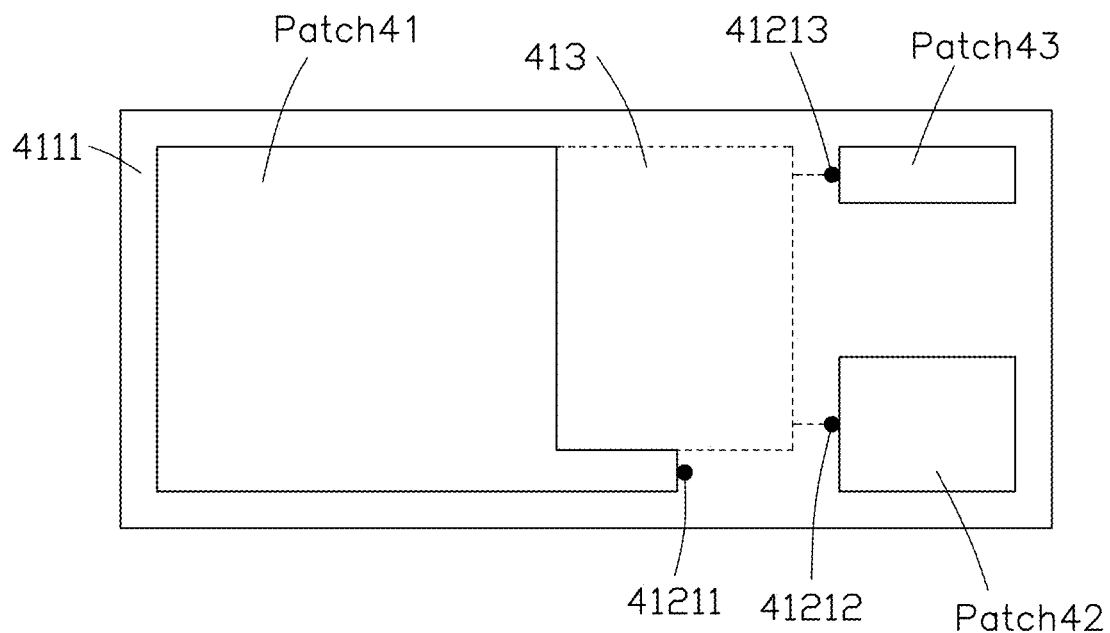
FIGS. 3A and 3B are schematic diagrams of the microminiaturized antenna feed module from another angle.
Figure 3B:
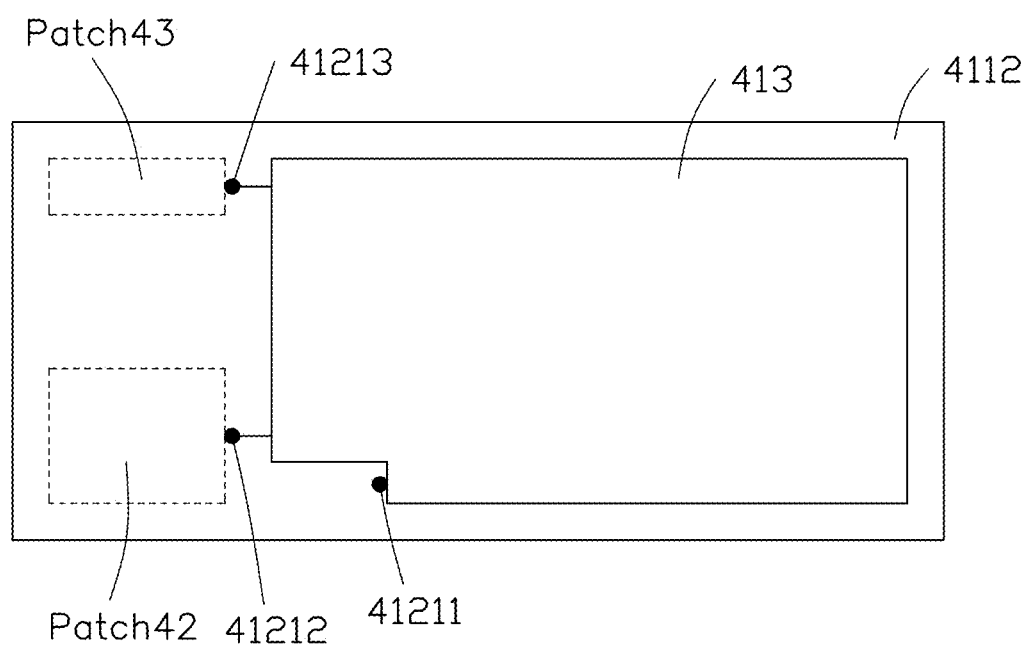

FIGS. 3A and 3B, in the embodiment of the present disclosure, show that the microminiaturized antenna feed module 400 includes a first coupled feed portion Patch 41, a second coupled feed portion Patch 42, and a third coupled feed portion Patch 43. The first coupled feed portion Patch 41, the second coupled feed portion Patch 42, and the third coupled feed portion Patch 43 are each in a form of a metal sheet. The first coupled feed portion Patch 41, the second coupled feed portion Patch 42, and the third coupled feed portion Patch 43 are disposed on the first surface 4111 of the substrate 411. The first coupled feed portion Patch 41, the second coupled feed portion Patch 42, and the third coupled feed portion Patch 43 may be connected to the second surface 4112 of the substrate 411 through a through hole or a via.

In one of the embodiments, the first coupled feed portion Patch 41, the second coupled feed portion Patch 42, and the third coupled feed portion Patch 43 are coplanar in the first surface 4111. The first coupled feed portion Patch 41, the second coupled feed portion Patch 42, and the third coupled feed portion Patch 43 are spaced apart from each other and not overlapped. The first coupled feed portion Patch 41 is generally L-shaped, and the second coupled feed portion Patch 42 and the third coupled feed portion Patch 43 are generally rectangular, their surfaces have no gaps, slots, or breakpoints, etc. Signal feed points 41211, 41212, and 41213 are respectively provided on one side of the corresponding coupled feed portions Patch 41, Patch 42, Patch 43. The signal feed points 41211, 41212, 41213 are used to electrically connect to feeding sources (not shown in the figures) through matching circuits (not shown in the figures), and electrical signals are thus fed to the coupled feed portions Patch 41, Patch 42, Patch 43.

The embodiment of the present disclosure does not limit the specific shape and structure of the coupled feed portions Patch 41, Patch 42, Patch 43.

The first coupled feed portion Patch 41, the second coupled feed portion Patch 42, and the third coupled feed portion Patch 43 are spaced apart from each other. Area and area allocations of the first coupled feed portion Patch 41, the second coupled feed portion Patch 42, and the third coupled feed portion Patch 43 are different and adjustable according to bandwidth requirement, so as to provide extended bandwidths with greater or smaller areas. For example, the first coupled feed portion Patch 41, the second coupled feed portion Patch 42, and the third coupled feed portion Patch 43 are close to a radiator (the radiator can be a metal frame of the electronic device, any conductor, such as iron, copper foil on a PCB soft board, a conductor in a laser direct structuring (LDS) process, etc., which are not specifically limited here), and configured to couple electrical signals to the radiator to transmit and receive wireless signals through the radiator. Obviously, the greater the area of the coupled feed portion, the greater will be the frequency width, so as to provide wider frequency coupling effect through greater areas. In the embodiment of the present disclosure, an area of the first coupled feed portion Patch 41 is greater than an area of the second coupled feed portion Patch 42, and the area of the second coupled feed portion Patch 42 is greater than an area of the third coupled feed portion Patch 43. A projection area of the first coupled feed portion Patch 41 on the substrate 411 occupies over 40% of the area of the substrate 411, a projection area of the second coupled feed portion Patch 42 on the substrate 411 occupies less than 10% of the area of the substrate 411, and a projection area of the third coupled feed portion Patch 43 on the substrate 411 occupies less than 10% of the area of the substrate 411.

FIGS. 1, 2, 3A, and 3B, in the embodiment of the present disclosure, show that the active circuit 413 is disposed on the second surface 4112 of the substrate 411. The second surface 4112 of the substrate 411 is provided with connection lines (not shown). The connection lines are connected to the active circuit 413. The active circuit 413 may include a switch, and/or other adjustable elements that can change impedances (not shown in the figures). The active circuit 413 can be electrically connected to the first coupled feed portion Patch 41, the second coupled feed portion Patch 42, and the third coupled feed portion Patch 43 and the connector 414 through the connection lines. For example, in one of the embodiments, the substrate 411 is further provided with a via (not shown), and the first coupled feed portion Patch 41, the second coupled feed portion Patch 42, and the third coupled feed portion Patch 43 can be connected to the second surface 4112 of the substrate 411 through the via, and connected to the active circuit 413 through the connection lines on the second surface 4112.

The connector 414 is arranged on the second surface 4112 of the substrate 411, where the active circuit 413 is located. In some embodiments, the connector 414 and the active circuit 413 may be spaced apart and electrically connected to each other. In the embodiment of the present disclosure, the specific positional relationship and connection relationship between the connector 414 and the active circuit 413 are not limited. For example, in one of the embodiments, the active circuit 413 can be disposed in the connector 414, the connector 414 can be used to accommodate the active circuit 413. The connector 414 is electrically connected to the active circuit 413 and connected to a transmission line, to realize signal sending or receiving.

It can be understood that the transmission line can be, but is not limited to, a coaxial cable, a flexible printed circuit board (FPCB) or other transmission lines.

Figure 4A:
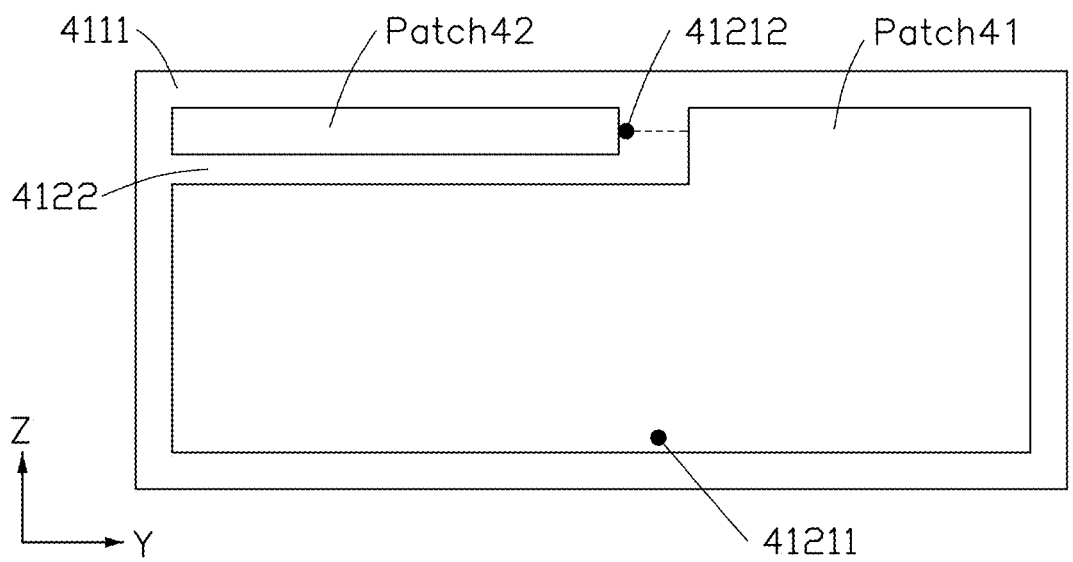
FIGS. 4A to 4C are schematic diagrams of the microminiaturized antenna feed module according to another embodiment of the present disclosure.
Figure 4B:
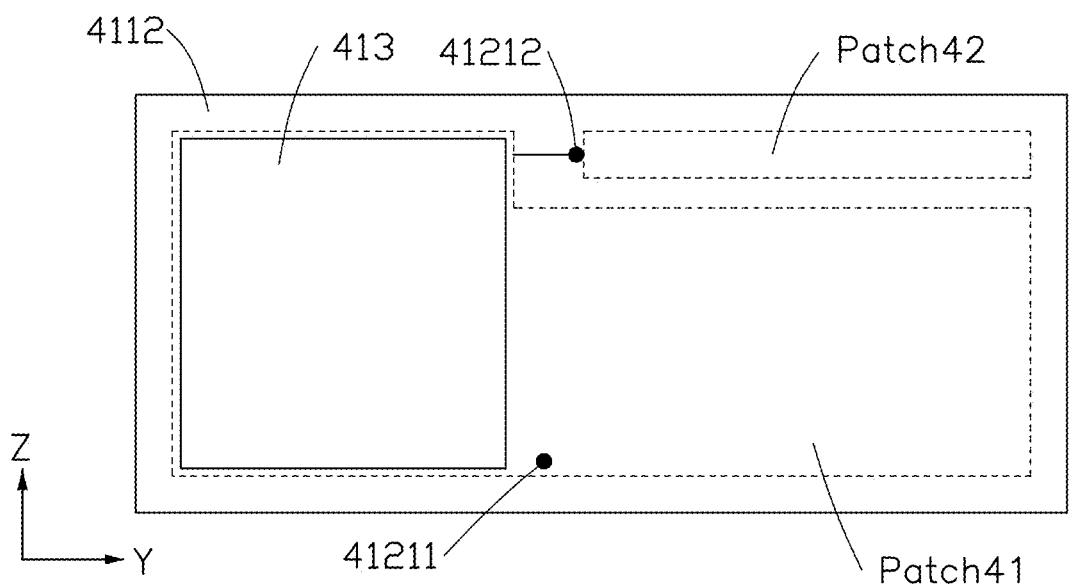
Figure 4C:
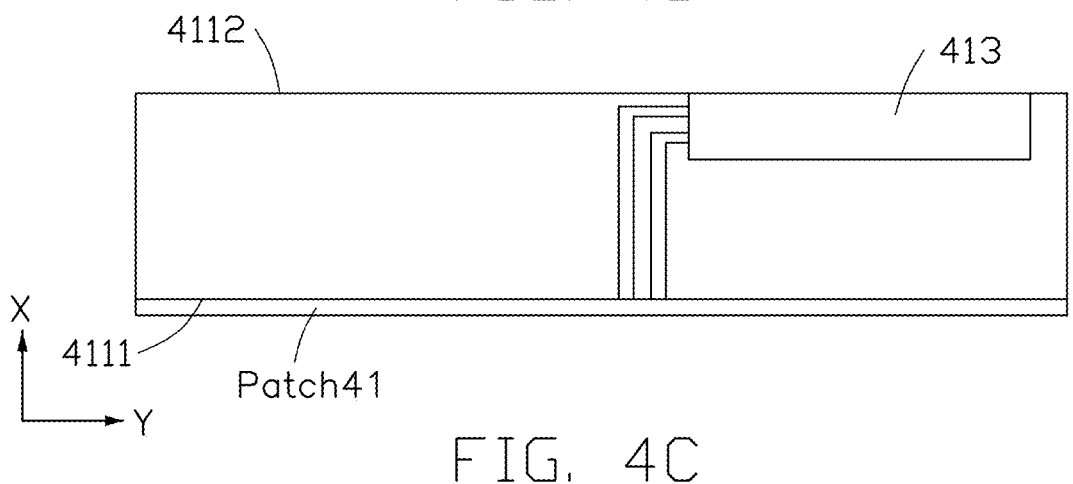

Embodiment of First Arrangement:

FIG. 4A to FIG. 4C, in another embodiment of the present disclosure, show that the microminiaturized antenna feed module 400 includes the first coupled feed portion Patch 41 and the second coupled feed portion Patch 42. The first coupled feed portion Patch 41 and the second coupled feed portion Patch 42 may be divided by a slot 4122 in a single metal piece. For instance, as shown in FIG. 4A, the slot 4122 is substantially L-shaped. In the embodiment, one of the coupled feed portions (such as the first coupled feed portion Patch 41) is substantially L-shaped, another coupled feed portion (such as the second coupled feed portion Patch 42) is substantially rectangular. The first coupled feed portion Patch 41 and the second coupled feed portion Patch 42 respectively have signal feed points 41211, 41212 for feeding electrical signals for the coupled feed portions. As shown in FIGS. 4A to 4C, the first coupled feed portion Patch 41 and the second coupled feed portion Patch 42 are arranged on the first surface 4111 of the substrate 411, that is, the first coupled feed portion Patch 41 and the second coupled feed portion Patch 42 are coplanar but not overlapped, these can be connected to the second surface 4112 of the substrate 411 through the through holes or vias.

Referring to FIGS. 4A to 4C, projections of the first coupled feed portion Patch 41 and the second coupled feed portion Patch 42 along a first direction are not overlapped, and are coplanar on a plane formed by a second direction and a third direction. The first direction may be a direction of the first coupled feed portion Patch 41 and the second coupled feed portion Patch 42 facing the second surface 4112 of the substrate 411, or a direction along a thickness of the substrate 411, which may be an X-axis direction, as shown in FIG. 4C. The second direction may be an extending direction along or parallel to the first surface 4111 of the substrate 411, or a length direction of the first surface 4111 of the substrate 411, which may be a Y-axis direction, as shown in FIGS. 4A to 4C. The first direction is substantially perpendicular to the second direction. The third direction may be an extending direction along or parallel to the first surface 4111 of the substrate 411, or a width direction of the first surface 4111 of the substrate 411, which may be a Z-axis direction, as shown in FIGS. 4A to 4B. The third direction is substantially perpendicular to the first direction and the second direction.

The embodiment of the present disclosure does not limit the specific shape and structure of the coupled feed portions Patch 41, Patch 42.

The first coupled feed portion Patch 41 and the second coupled feed portion Patch 42 are coplanar and spaced apart from each other. Areas ratios of the first coupled feed portion Patch 41 and the second coupled feed portion Patch 42 are different and adjustable according to bandwidth requirement, so as to provide greater bandwidth coupling effect. For example, the first coupled feed portion Patch 41 and the second coupled feed portion Patch 42 are close to, but not contacting, the radiator (the radiator can be a metal frame of the electronic device, any conductor, such as iron, copper foil on a PCB soft board, a conductor in a laser direct structuring (LDS) process, etc., which are not specifically limited here), and configured to couple electrical signals to the radiator to transmit and receive wireless signals through the radiator. Obviously, the greater the area of the coupled feed portion, the greater will be the frequency width, so as to provide wide frequency coupling effect through greater areas. In the embodiment of the present disclosure, an area of the first coupled feed portion Patch 41 is greater than an area of the second coupled feed portion Patch 42. A projection area of the first coupled feed portion Patch 41 on the substrate 411 occupies over 40% of the area of the substrate 411, a projection area of the second coupled feed portion Patch 42 on the substrate 411 occupies less than 10% of the area of the substrate 411.

In the embodiment of the present disclosure, the active circuit 413 is disposed on the second surface 4112 of the substrate 411. The second surface 4112 of the substrate 411 is provided with connection lines (not shown). The connection lines are connected to the active circuit 413. The active circuit 413 may include a switch, and/or other adjusting element that can change impedances (not shown in the figures). The active circuit 413 can be electrically connected to the first coupled feed portion Patch 41 and the second coupled feed portion Patch 42 and the connector 414 through the connection lines. For example, in one of the embodiments, the substrate 411 is further provided with a via. An example of the via is the lines connecting the active circuit 413 and the first coupled feed portion Patch 41 as shown in FIG. 4C. The first coupled feed portion Patch 41 and the second coupled feed portion Patch 42 can be connected to the second surface 4112 of the substrate 411 through the via, and connected to the active circuit 413 through the connection lines on the second surface 4112.

FIG. 2 shows the connector 414 arranged on the second surface 4112 of the substrate 411, the connector 414 is arranged on the surface where the active circuit 413 is located. In some embodiments, the connector 414 and the active circuit 413 may be spaced apart and electrically connected to each other. In the embodiment of the present disclosure, the specific positional relationship and connection relationship between the connector 414 and the active circuit 413 are not limited. For example, in one of the embodiments, the active circuit 413 can be disposed in the connector 414, the connector 414 can be used to accommodate the active circuit 413. The connector 414 is electrically connected to the active circuit 413 and connected to a transmission line, and so realize signal sending or receiving.

It can be understood that the transmission line can be, but is not limited to, a coaxial cable, a flexible printed circuit board (FPCB) or other transmission line.

Figure 5A:
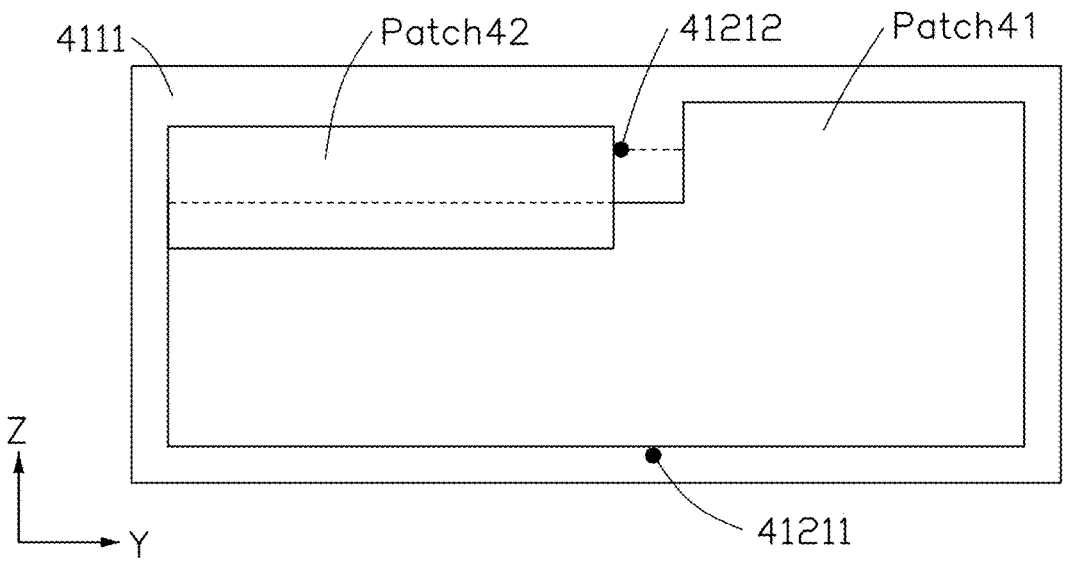
FIGS. 5A to 5C are schematic diagrams of the microminiaturized antenna feed module according to another embodiment of the present disclosure.
Figure 5B:
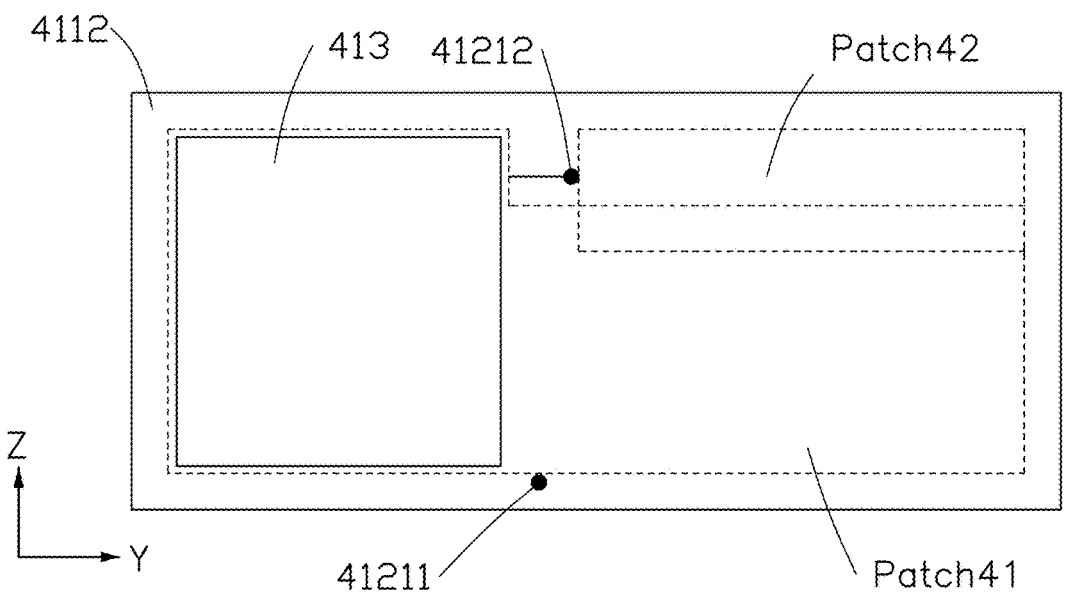
Figure 5C:
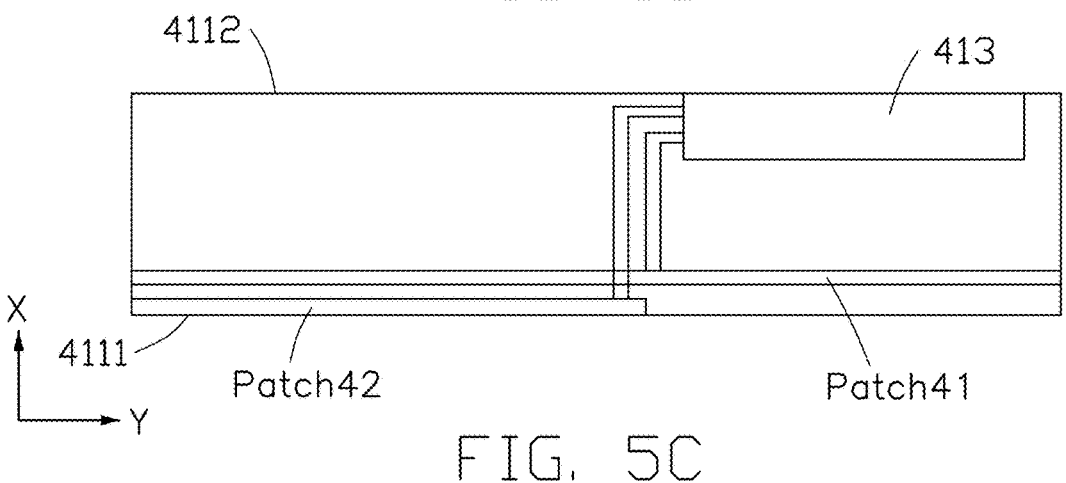

Embodiment of Second Arrangement:

FIGS. 5A to 5C, in another embodiment of the present disclosure, show that the microminiaturized antenna feed module 400 includes the first coupled feed portion Patch 41 and the second coupled feed portion Patch 42. The first coupled feed portion Patch 41 and the second coupled feed portion Patch 42 are not coplanar on the plane orthogonal to the second direction (such as a Y-axis direction as shown in FIG. 5C), projections of the first coupled feed portion Patch 41 and the second coupled feed portion Patch 42 along the first direction (such as the X-axis direction shown in FIG. 5C) are partially overlapped. Description of the first direction and the second direction may be the same as those for FIG. 4C. Specifically, the second coupled feed portion Patch 42 is arranged on the first surface 4111 of the substrate 411, the first coupled feed portion Patch 41 is arranged internally under the first surface 4111, and the first coupled feed portion Patch 41 is close to the first surface 4111. In an embodiment, the first coupled feed portion Patch 41 is not arranged on the first surface 4111 and disposed inside the substrate. In an embodiment, the substrate 411 may be made of a multi-layer substrate, the second coupled feed portion Patch 42 is arranged on a surface (such as the first surface 4111) of the substrate 411, the first coupled feed portion Patch 41 is arranged on an interior portion of the substrate 411. The first coupled feed portion Patch 41 and the second coupled feed portion Patch 42 can be connected to the second surface 4112 of the substrate 411 through the through holes or vias. In the embodiment, one of the coupled feed portions (such as the first coupled feed portion Patch 41) is substantially L-shaped, another coupled feed portion (such as the second coupled feed portion Patch 42) is substantially rectangular. The first coupled feed portion Patch 41 and the second coupled feed portion Patch 42 respectively have corresponding signal feed points 41211, 41212 for feeding electrical signals to the coupled feed portions.

The embodiment of the present disclosure does not limit the specific shapes and structures of the coupled feed portions Patch 41, Patch 42.

The first coupled feed portion Patch 41 and the second coupled feed portion Patch 42 are not coplanar and are partially overlapped along the first direction. Area ratios of the first coupled feed portion Patch 41 and the second coupled feed portion Patch 42 are different and adjustable according to bandwidth requirement. For example, the first coupled feed portion Patch 41 and the second coupled feed portion Patch 42 are close to the radiator, and configured to couple electrical signals to the radiator to transmit and receive wireless signals. In the embodiment of the present disclosure, an area of the first coupled feed portion Patch 41 is greater than an area of the second coupled feed portion Patch 42. A projection area of the first coupled feed portion Patch 41 on the substrate 411 occupies over 40% of the area of the substrate 411, and a projection area of the second coupled feed portion Patch 42 on the substrate 411 occupies less than 10% of the area of the substrate 411.

A structure and a function of the active circuit 413, the connections between the active circuit 413 and the connector 414, and the arrangements of the connector 414 are as previously described.

Figure 6A:
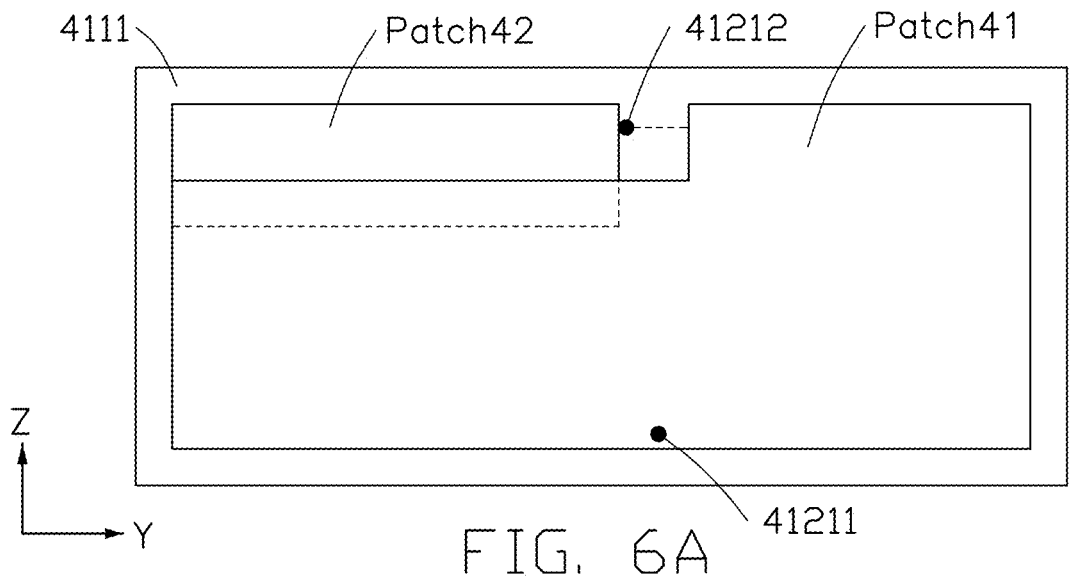
FIGS. 6A to 6C are schematic diagrams of the microminiaturized antenna feed module according to another embodiment of the present disclosure.
Figure 6B:
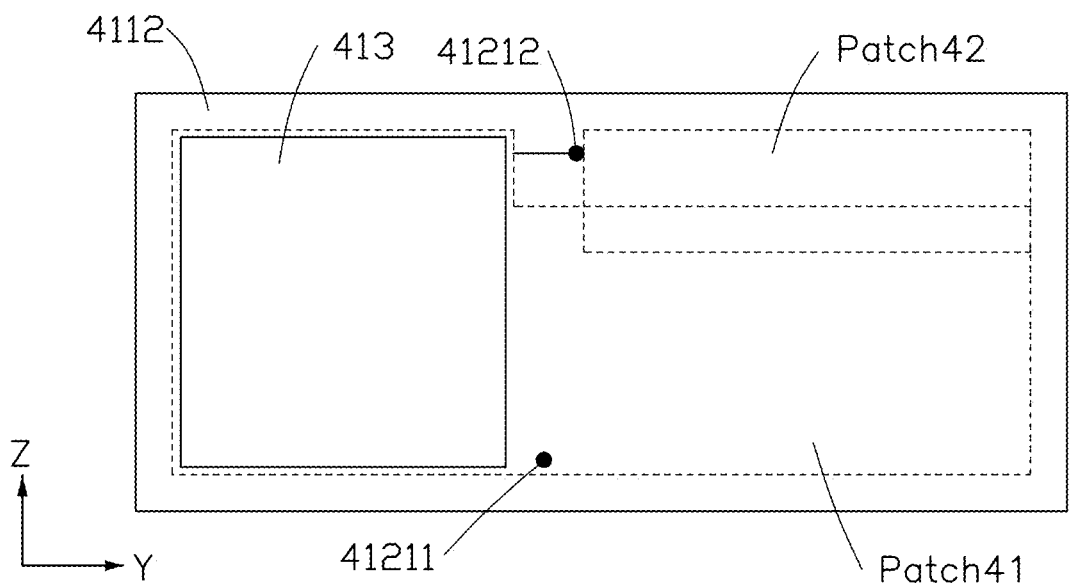
Figure 6C:
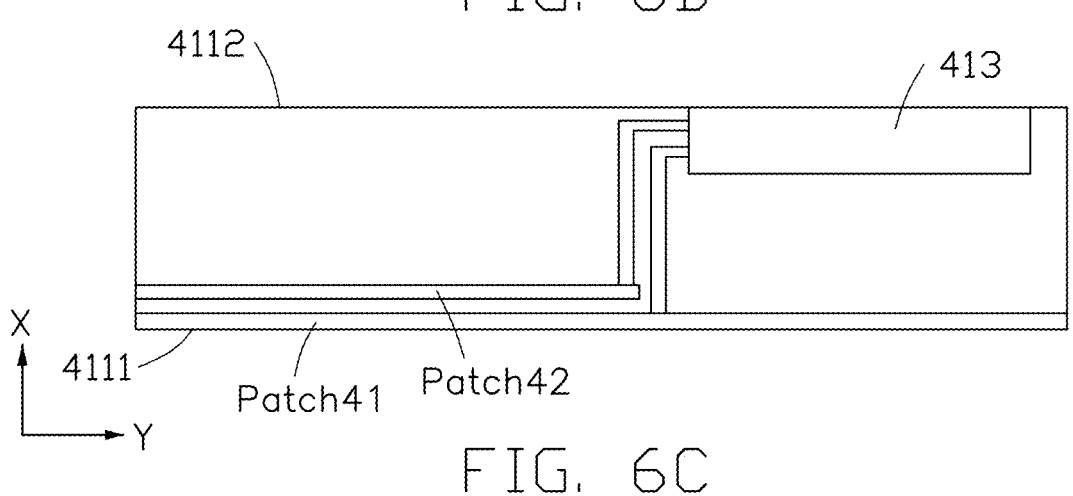

Embodiment of Third Arrangement:

FIGS. 6A to 6C show another embodiment of the present disclosure, the microminiaturized antenna feed module 400 includes the first coupled feed portion Patch 41 and the second coupled feed portion Patch 42. The first coupled feed portion Patch 41 and the second coupled feed portion Patch 42 are not coplanar on a plane orthogonal to the second direction (such as a Y-axis direction as shown in FIG. 6C), projections of the first coupled feed portion Patch 41 and the second coupled feed portion Patch 42 along the first direction (such as an X-axis direction as shown in FIG. 6C) are partially overlapped. The first direction and the second direction are as shown in FIG. 4C. Specifically, the first coupled feed portion Patch 41 is arranged on the first surface 4111 of the substrate 411, the second coupled feed portion Patch 42 is arranged internally under the first surface 4111, and the second coupled feed portion Patch 42 is close to the first surface 4111. In an embodiment, the substrate 411 may be a multi-layer substrate, the first coupled feed portion Patch 41 is arranged on a surface (such as the first surface 4111) of the substrate 411, the second coupled feed portion Patch 42 is arranged on an interior portions of the substrate 411. The first coupled feed portion Patch 41 and the second coupled feed portion Patch 42 can be connected to the second surface 4112 of the substrate 411 through the through holes and vias. In the embodiment, one of the coupled feed portions (such as the first coupled feed portion Patch 41) is substantially L-shaped, another coupled feed portion (such as the second coupled feed portion Patch 42) is substantially rectangular. The first coupled feed portion Patch 41 and the second coupled feed portion Patch 42 respectively have correspondingly signal feed points 41211, 41212 for feeding electrical signals to the coupled feed portions.

The embodiment of the present disclosure does not limit the specific shapes and structures of the coupled feed portions Patch 41, Patch 42.

The first coupled feed portion Patch 41 and the second coupled feed portion Patch 42 are not coplanar and are partially overlapped along the first direction. Area and ratios of the first coupled feed portion Patch 41 and the second coupled feed portion Patch 42 are different and adjustable according to bandwidth requirement, so as to provide greater bandwidth coupling effect with great areas. For example, the first coupled feed portion Patch 41 and the second coupled feed portion Patch 42 are close to the radiator (the radiator can be the metal frame of the electronic device, any conductor, such as iron, copper foil on a PCB soft board, a conductor in a laser direct structuring (LDS) process, etc., which are not specifically limited here), and configured to couple electrical signals to the radiator to transmit and receive wireless signals through the radiator. Obviously, the greater the area of the coupled feed portion, the greater frequency width will be, so as to provide wide frequency coupling effect through greater areas. In the embodiment of the present disclosure, an area of the first coupled feed portion Patch 41 is greater than an area of the second coupled feed portion Patch 42. A projection area of the first coupled feed portion Patch 41 on the substrate 411 occupies over 40% of the area of the substrate 411, a projection area of the second coupled feed portion Patch 42 on the substrate 411 occupies less than 10% of the area of the substrate 411.

The structure and a function of the active circuit 413, a connection between the active circuit 413 and the connector 414, and an arrangement of the connector 414 are as previously described.

Figure 7:
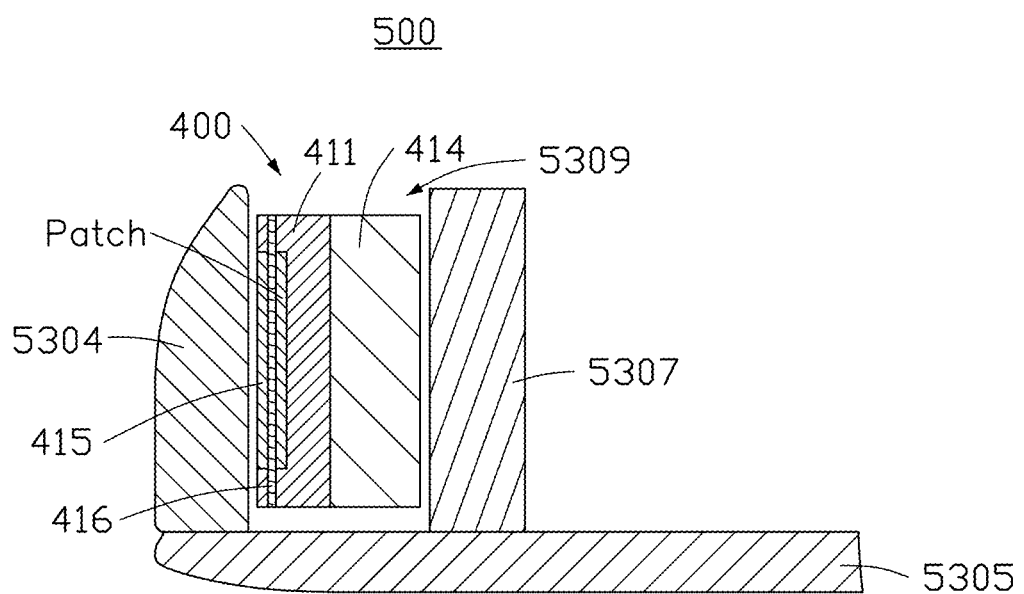
FIG. 7 is a schematic diagram of the microminiaturized antenna feed module and a metal frame of an electronic device, of one embodiment of the present disclosure.
Figure 8:
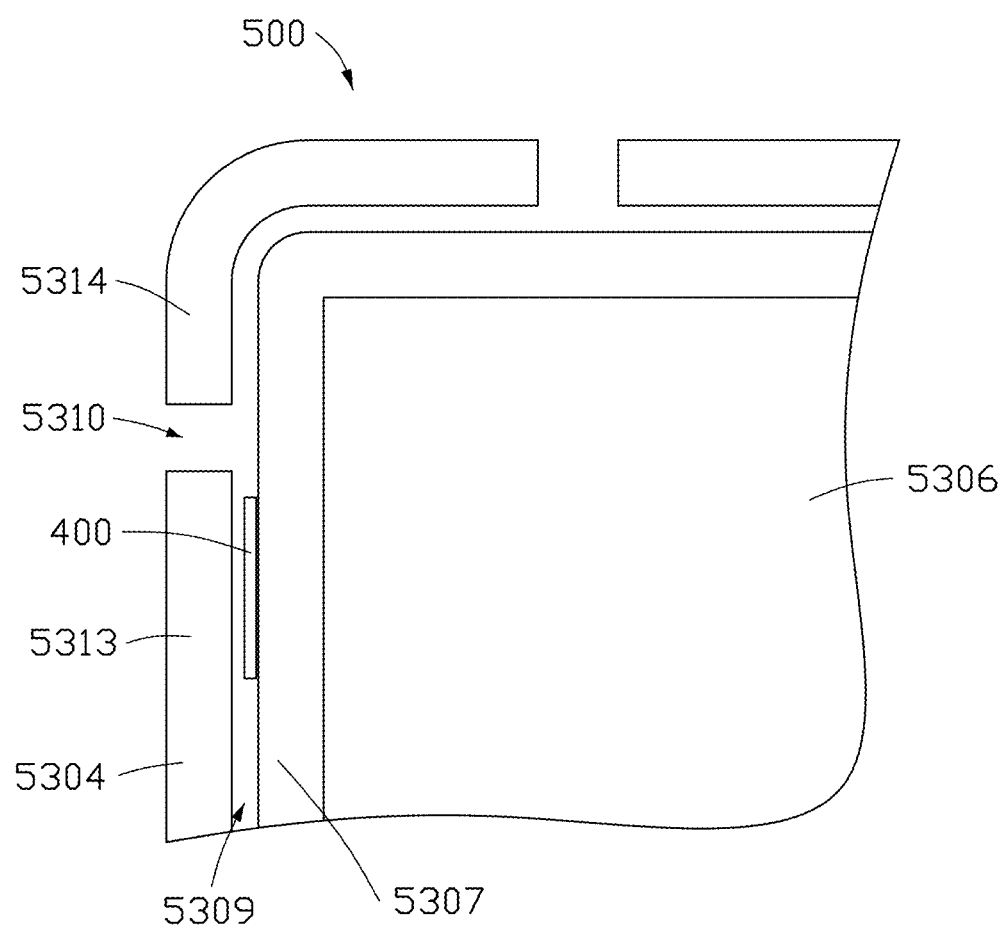
FIG. 8 is a schematic diagram of the microminiaturized antenna feed module applied to the electronic device of an embodiment of the present disclosure.

Referring to FIGS. 7 and 8, when the microminiaturized antenna feed module 400 is used, the microminiaturized antenna feed module 400 can be arranged on one side of a metal frame 5304 of an electronic device 500. One side of the microminiaturized antenna feed module 400 provided with the first coupled feed portion Patch 41, the second coupled feed portion Patch 42, and the third coupled feed portion Patch 43 faces the metal frame 5304. Therefore, signals can be transmitted and/or received by the metal frame 5304 through the coupling of the first coupled feed portion Patch 41, the second coupled feed portion Patch 42, and the third coupled feed portion Patch 43 and the metal frame 5304. In addition, the microminiaturized antenna feed module 400 can also use the switch of the active circuit 413 to switch between multiple radiation modes, thereby realizing multiple broadband operations.

For example, in one of the embodiments, when the microminiaturized antenna feed module 400 includes three coupled feed portions Patch 41, Patch 42, Patch 43, and the active circuit 413. The three coupled feed portions Patch 41, Patch 42, Patch 43 are arranged at intervals, and are spaced apart from the metal frame 5304, to receive 4G/5G middle frequency signals (frequency range of 1.7 GHz-2.2 GHz), high frequency signals (frequency range of 2.3 GHz-2.7 GHz), ultra high band (UHB) signals (frequency range of 3.3 GHz-5 GHz), GPS signals (frequency range of 1.5 GHz-1.6 GHz), WI-FI signals (frequency range of 2.4 GHz, 5 GHz), 5G-Sub 6 signals (frequency range of 0.45 GHz-6 GHz), and 5G-Sub 7 signals (frequency range of 5.925 GHz-7.125 GHz), Wi-Fi 6E signals (frequency range of 5.925 GHz-7.125 GHz).

In the embodiment of the present disclosure, the range of frequencies of the microminiaturized antenna feed module 400 is not limited. For example, the shape, length, width and other parameters of the microminiaturized antenna feed module 400 can be adjusted to achieve the required frequency. The shape, length, width, area and other parameters of the coupled feed portion Patch can also be adjusted according to the required frequency.

In the embodiment of the present disclosure, the metal frame 5304 may further be any conductor, such as iron, copper foil on a PCB soft board, a conductor in a laser direct structuring (LDS) process, etc., which are not specifically limited here. In one of the embodiments, the metal frame 5304 is a metal frame of an electronic device. The metal frame 5304 is disposed on a backplane 5305 and is spaced apart from an electronic component, such as a middle frame 5307. The microminiaturized antenna feed module 400 is arranged between the metal frame 5304 and the middle frame 5307. The middle frame 5307 is disposed on the backplane 5305.

In the embodiment of the present disclosure, the coupled feed portion Patch and the metal frame 5304 are spaced apart. For example, the coupled feed portion Patch and the metal frame 5304 are arranged in parallel. For another example, the coupled feed portion Patch and the metal frame 5304 are spaced apart, but not parallel to each other. In other embodiments, the coupled feed portion Patch may not be connected to the metal frame 5304. For another example, in another embodiment, the coupled feed portion Patch and the metal frame 5304 are spaced apart, and there is no electrical connection between the coupled feed portion Patch and the metal frame 5304.

In the embodiments of the present disclosure, the specific structure of the metal frame 5304, and/or its connection relationship with other components are not limited. For example, one end of the metal frame 5304 may be connected to ground (the metal frame 5304 is grounded), or not connected to ground. For another example, the metal frame 5304 may be provided with or without gaps breakpoints, or slots.

FIGS. 7 and 8 show that in an embodiment of the present disclosure, the microminiaturized antenna feed module 400 can be applied to the electronic device 500 to transmit and receive radio waves to transmit and exchange wireless signals. The electronic device 500 may be a handheld communication device (such as a mobile phone), a foldable phone, a smart wearable device (such as a watch, earphone, etc.), a tablet computer, a personal digital assistant (personal digital assistant, PDA), which is not specifically limited here.

The electronic device 500 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology, and other future communication technologies.

In the embodiment of the present disclosure, the electronic device 500 is a mobile phone as an example for description.

FIGS. 7 and 8 show, in one embodiment, that the electronic device 500 includes the metal frame 5304, a backplane 5305, a ground plane 5306, and the middle frame 5307. The metal frame 5304 is made of metal or other conductive materials. The backplane 5305 may be made of metal or other conductive materials. The metal frame 5304 is disposed on the edge of the backplane 5305 and forms an accommodating space 5308 together with the backplane 5305. An opening (not shown in the figure) is provided on the side of the metal frame 5304 opposite to the backplane 5305 for accommodating a display unit (not shown).

The display unit has a display plane, and the display plane is exposed at the opening. It can be understood that the display unit can be combined with a touch sensor to form a touch screen. The touch sensor can also be called touch panel or touch sensitive panel.

In the embodiment of the present disclosure, the display unit has a high screen-to-body ratio. That is, the area of the display plane of the display unit is greater than 70% of the frontal area of the electronic device, and even a frontal full screen can be achieved. Specifically, in the embodiment of the present disclosure, the full screen means that except for the necessary slots opened on the electronic device 500, the left, right, and lower sides of the display unit can be seamlessly connected to the metal frame 5304.

The ground plane 5306 may be made of metal or other conductive materials. The ground plane 5306 can be disposed in the accommodating space enclosed by the metal frame 5304 and the backplane 5305, and is connected to the backplane 5305.

The middle frame 5307 is made of metal or other conductive materials. The shape and area of the middle frame 5307 may be smaller or larger than the ground plane 5306. The middle frame 5307 is stacked on the ground plane 5306. In this embodiment, the middle frame 5307 is a metal sheet disposed between the display unit and the ground plane 5306. The middle frame 5307 is used to support the display unit, provide electromagnetic shielding, and improve the mechanical strength of the electronic device 500.

In the embodiment, the metal frame 5304, the backplane 5305, the ground plane 5306, and the middle frame 5307 may form an integrally formed metal frame. The backplane 305, the ground plane 5306, and the middle frame 5307 are made of metal with large surface area, so they can jointly form the system ground plane (not shown in the figure) of the electronic device 500.

The middle frame 5307 and the metal frame 5304 are spaced apart, and a slit 5309 is formed between the middle frame 5307 and the metal frame 5304.

In other embodiment, the electronic device 500 may also include one or more of the following electronic components, such as a processor, a circuit board, a memory, an input and output circuit, an audio component (such as a microphone and a speaker), and a multimedia component (such as a front camera and/or a rear camera), sensor components (such as proximity sensors, distance sensors, ambient light sensors, acceleration sensors, gyroscopes, magnetic sensors, pressure sensors, and/or temperature sensors), which will not be repeated here.

When the microminiaturized antenna feed module 400 is applied to the electronic device 500, the microminiaturized antenna feed module 400 can be arranged in the slit 5309 and arranged substantially perpendicular to the plane where the ground plane 5306 is located. A part of the metal frame 5304 constitutes the radiator, and a gap 5310 is defined on the metal frame 5304. The gap 5310 separates the metal frame 5304 to divide the metal frame 5304 into a first part 5313 and a second part 5314 which are arranged at intervals. The first part 5313 and the second part 5314 are able to radiate wireless signals. The second part 5314 may be electrically connected to the system ground plane, such as the ground plane 5306.

The gap 5310 may be connected to the slit 5309 and be filled with insulating materials, such as plastic, rubber, glass, wood, ceramics, not being limited to this.

When the microminiaturized antenna feed module 400 is disposed in the slit 5309, the first coupled feed portion Patch 41, the second coupled feed portion Patch 42, and the third coupled feed portion Patch 43 on the microminiaturized antenna feed module 400 face, but are spaced apart from, the first part 5313. The connector 414 is arranged on the other surface of the substrate 411, that is, it is arranged away from the first part 5313. One end of the connector 414 is electrically connected to the middle frame 5307, and the other end is electrically connected to the substrate 411.

In another embodiment, the microminiaturized antenna feed module 400 may be disposed correspondingly to the first part 5313, the gap 5310, or the second part 5314. The first coupled feed portion Patch 41 may be disposed correspondingly to the first part 5313, the second coupled feed portion Patch 42 and/or the third coupled feed portion Patch 43 may be disposed correspondingly to the second part 5314. Thereby the microminiaturized antenna feed module 400 may feed electrical signals to the first part 5313 and the second part 5314.

Figure 9:
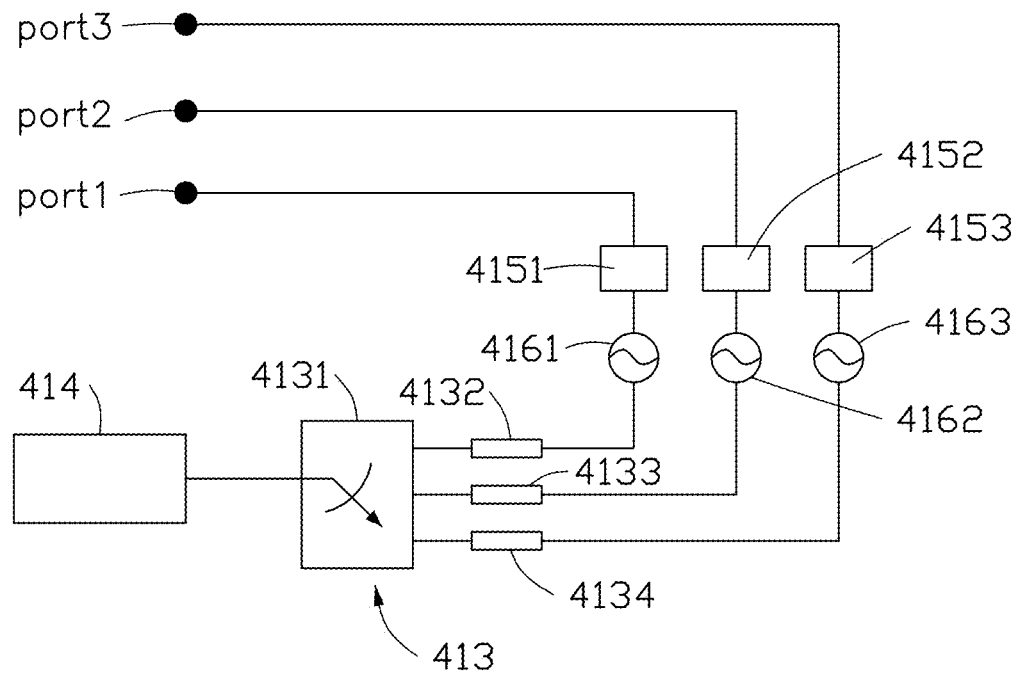
FIG. 9 is a schematic diagram of the circuit connections of an active circuit of the microminiaturized antenna feed module shown in FIG. 8.

FIG. 9 shows that each of the first coupled feed portion Patch 41, the second coupled feed portion Patch 42, and the third coupled feed portion Patch 43 includes a corresponding signal feed point (for example, a first signal feed point port1, a second signal feed point port2, and a third signal feed point port3, and the aforementioned signal feed points 41211, 41212, 41213). Each signal feed point is electrically connected to the feed source through the matching unit. For example, the signal feed point port1 of the first radiation branch Patch 41 is electrically connected to the feeding source 4161 through the first matching unit 4151. The signal feed point port2 of the second radiation branch Patch 42 is electrically connected to the feeding source 4162 through the second matching unit 4152. The signal feed point port3 of the third radiation branch Patch 43 is electrically connected to the feeding source 4163 through the third matching unit 4153.

The active circuit 413 in the microminiaturized antenna feed module 400 is spaced apart from the connector 414. As shown in FIG. 9, the active circuit 413 includes a switch 4131 and adjustable elements 4132, 4133, 4134. One end of the switch 4131 is electrically connected to the connector 414, and the other end of the switch 4131 is electrically connected to a feed source through adjustable elements 4132, 4133, 4134. For example, the switch 4131 is electrically connected to the first feeding source 4161 through the first adjustable element 4132, the switch 4131 is electrically connected to the second feeding source 4162 through the second adjustable element 4133, and the switch 4131 is electrically connected to the third feeding source 4163 through the third adjustable element 4134. That is, the matching circuit includes at least a first matching unit 4151, a second matching unit 4152, and a third matching unit 4153.

The first coupled feed portion Patch 41, the second coupled feed portion Patch 42, and the third coupled feed portion Patch 43 are coupled to the first part 5313 to resonate for various radiation modes. The coupling state between the coupled feed portions can be controlled, and independent modes with tunability and good antenna efficiency can be generated through coupling. The switch 4131 in the active circuit 413 can switch between multiple modes, and use multiple adjustable elements (for example, adjustable elements 4132, 4133, 4134) to achieve multiple frequency bands.

The switch 4131 is a mid-high frequency/UHB and NR/Wi-Fi 2.4G WI-FI 5G and LAA switch, used to switch in mid-high frequency/UHB and NR/Wi-Fi 2.4G; Wi-Fi 5G and LAA Frequency bands.

The microminiaturized antenna feed module 400 can be applied to the electronic device 500, to increase the antenna efficiency bandwidth and have the best antenna efficiency, and the switching of the switch 4131 can effectively improve the antenna frequency coverage. In one embodiment, the applicable working frequency range of the microminiaturized antenna feed module 400 can cover the middle frequency of 1.71 GHz to 2.17 GHz, the high frequency of 2.3 GHz-2.69 GHz, UHF 3.4 GHz to 3.8 GHz, Wi-Fi 2.4G WI-FI 5G and LAA, and can support 5G Sub 6 N77/N78/N79, 5G Sub 7, and WI-FI 6E frequency bands.

The microminiaturized antenna feed module 400 can set each of the coupled feed portions Patch 41, Patch 42, Patch 43 as an independent sheet body, and set signal feed points at appropriate positions of the coupled feed portions Patch 41, Patch 42, Patch 43, and the radiator (or the metal frame of the electronic device 500, for example, the first part 5313) is used as a metal radiator, the radiator and the microminiaturized antenna feed module 400 couple the energy to resonate in the slit 5309, to cover modes of middle, high frequency, UHF, 5G Sub 6 N77, 5G Sub6 N78, 5G Sub 6 N79, WI-FI 2.4G Wi-Fi 5G Sub 7, WI-FI 6E frequency bands, so as to greatly increase its bandwidth and antenna efficiency, and can also cover the world's commonly used 5G communication frequency bands and Carrier Aggregation (CA) supporting LTE-A (short for LTE-Advanced, which is the subsequent evolution of LTE technology).

Figure 10:
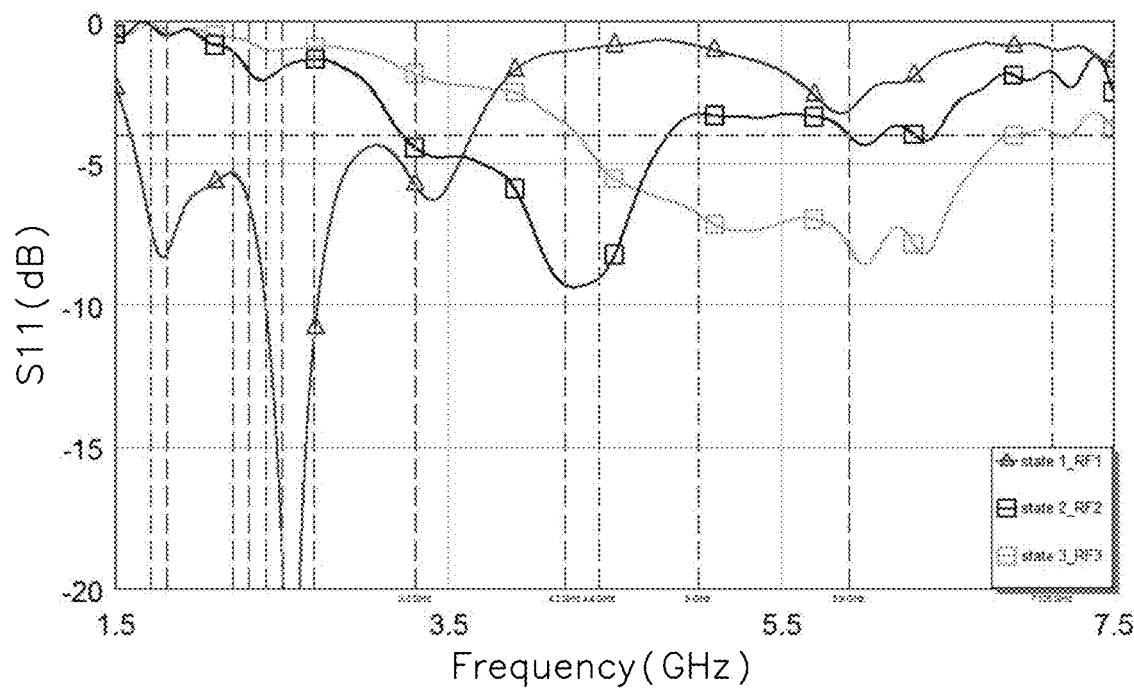
FIG. 10 shows graphs of S parameters (scattering parameters) of the microminiaturized antenna feed module shown in FIGS. 3A and 3B.

FIG. 10 shows a graph of S parameters (scattering parameters) when the microminiaturized antenna feed module 400 uses each of the coupled feed portions Patch 41, Patch 42, Patch 43 coupling to the metal frame 5304 for radiating wireless signals. FIG. 10 shows a graph of S parameters when the microminiaturized antenna feed module 400 uses the first coupled feed portion Patch 41, the second coupled feed portion Patch 42, and the third coupled feed portion Patch 43 as shown in FIGS. 3A and 3B coupling to the metal frame 5304 for radiating wireless signals.

The switch 4131 switches to different signal feed points, the frequency mode can be controlled to cover the middle frequency of 1.71 GHz-2.17 GHz, the high frequency of 2.3 GHz-2.69 GHz, UHF 3.4 GHz-3.8 GHz, GPS, WI-FI 2.4G WI-FI 5G and LAA frequency bands, and can support 5G Sub 6 N77/N78/N79, 5G Sub 7, WI-FI 6E frequency bands.

Figure 11:
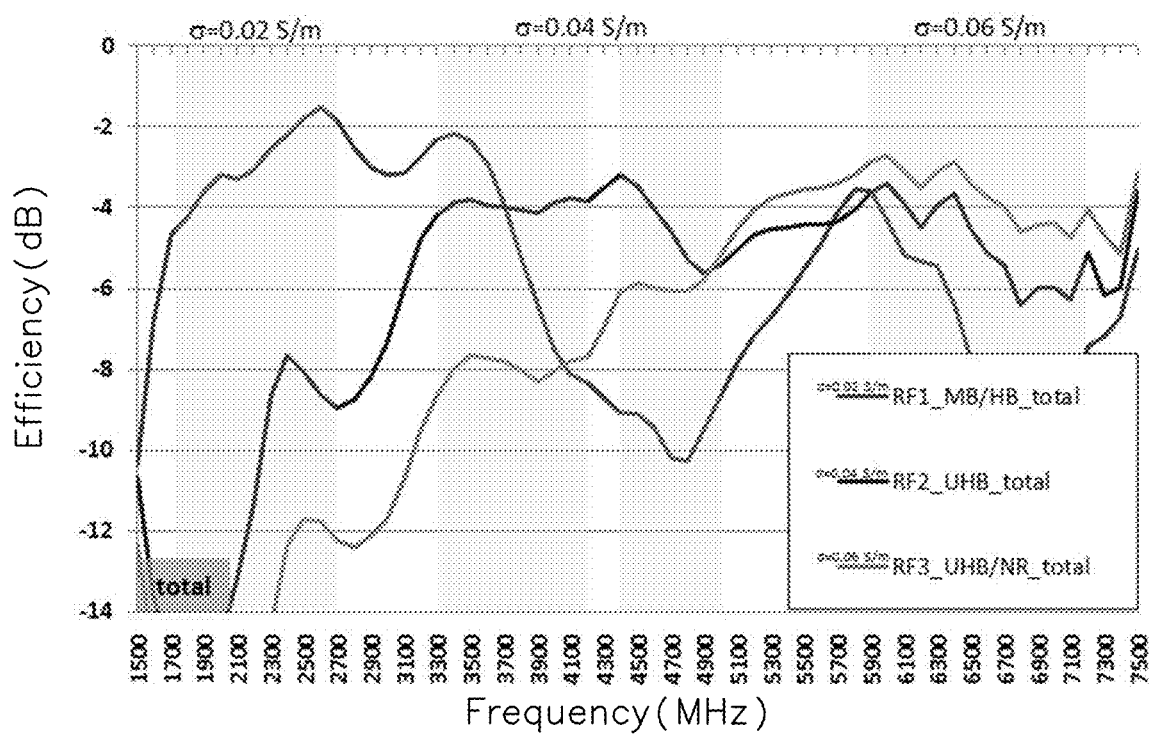
FIG. 11 shows efficiency graphs of the microminiaturized antenna feed module shown in FIGS. 3A and 3B.

FIG. 11 shows an efficiency graph when the microminiaturized antenna feed module 400 uses each of the coupled feed portions Patch 41, Patch 42, Patch 43 coupling to the metal frame 5304 for radiating wireless signals. FIG. 11 shows an efficiency graph when the microminiaturized antenna feed module 400 uses the first coupled feed portion Patch 41, the second coupled feed portion Patch 42, and the third coupled feed portion Patch 43 as shown in FIGS. 3A and 3B, coupling to the metal frame 5304 for radiating wireless signals.

Figure 12A:
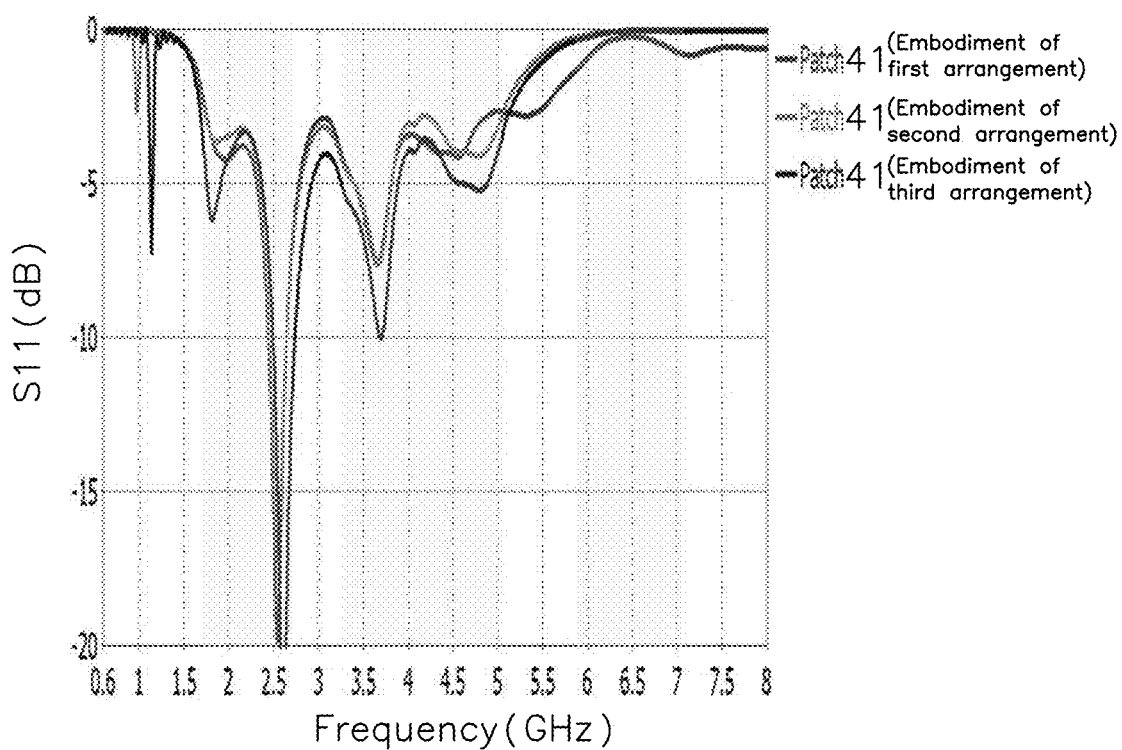
FIGS. 12A and 12B show graphs of S parameters (scattering parameters) of the microminiaturized antenna feed module shown in FIGS. 4A, 5A, and 6A.

FIG. 12A shows a graph of S parameters (scattering parameters) when the microminiaturized antenna feed module 400 uses the first coupled feed portion Patch 41 in the first arrangement embodiment as shown in FIGS. 4A to 4C, in the second arrangement embodiment as shown in FIGS. 5A to 5C, and in the third arrangement embodiment as shown in FIGS. 6A to 6C, coupling to the metal frame 5304 for radiating wireless signals. FIG. 12A shows a graph of S parameters (scattering parameters) when the microminiaturized antenna feed module 400 uses the first coupled feed portion Patch 41 and the second coupled feed portion Patch 42 arranged on the first surface 4111 as shown in FIGS. 4A to 4C; the second coupled feed portion Patch 42 arranged on the first surface 4111, and the first coupled feed portion Patch 41 arranged internally to the first surface 4111 as shown in FIGS. 5A to 5C; the first coupled feed portion Patch 41 arranged on the first surface 4111, and the second coupled feed portion Patch 42 arranged internally to the first surface 4111 as shown in FIGS. 6A to 6C, coupling to the metal frame 5304 for radiating wireless signals.

Figure 12B:
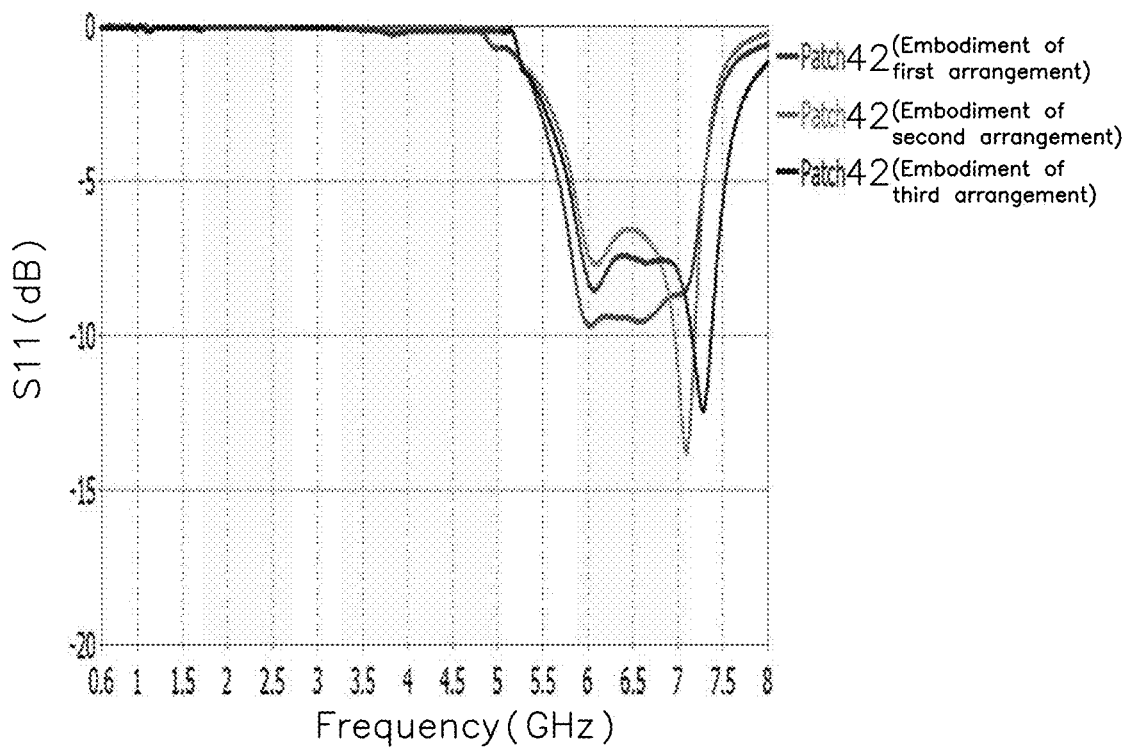

FIG. 12B shows a graph of S parameters (scattering parameters) when the microminiaturized antenna feed module 400 uses the second coupled feed portion Patch 42 in the first arrangement embodiment as shown in FIGS. 4A to 4C, in the second arrangement embodiment as shown in FIGS. 5A to 5C, and in the third arrangement embodiment as shown in FIGS. 6A to 6C, coupling to the metal frame 5304 for radiating wireless signals. FIG. 12B shows a graph of S parameters when the microminiaturized antenna feed module 400 uses the first coupled feed portion Patch 41 and the second coupled feed portion Patch 42 arranged on the first surface 4111 as shown in FIGS. 4A to 4C; the second coupled feed portion Patch 42 arranged on the first surface 4111, and the first coupled feed portion Patch 41 arranged internally to the first surface 4111 as shown in FIGS. 5A to 5C; the first coupled feed portion Patch 41 arranged on the first surface 4111, and the second coupled feed portion Patch 42 arranged internally to the first surface 4111 as shown in FIGS. 6A to 6C, coupling to the metal frame 5304 for radiating wireless signals.

Figure 13A:
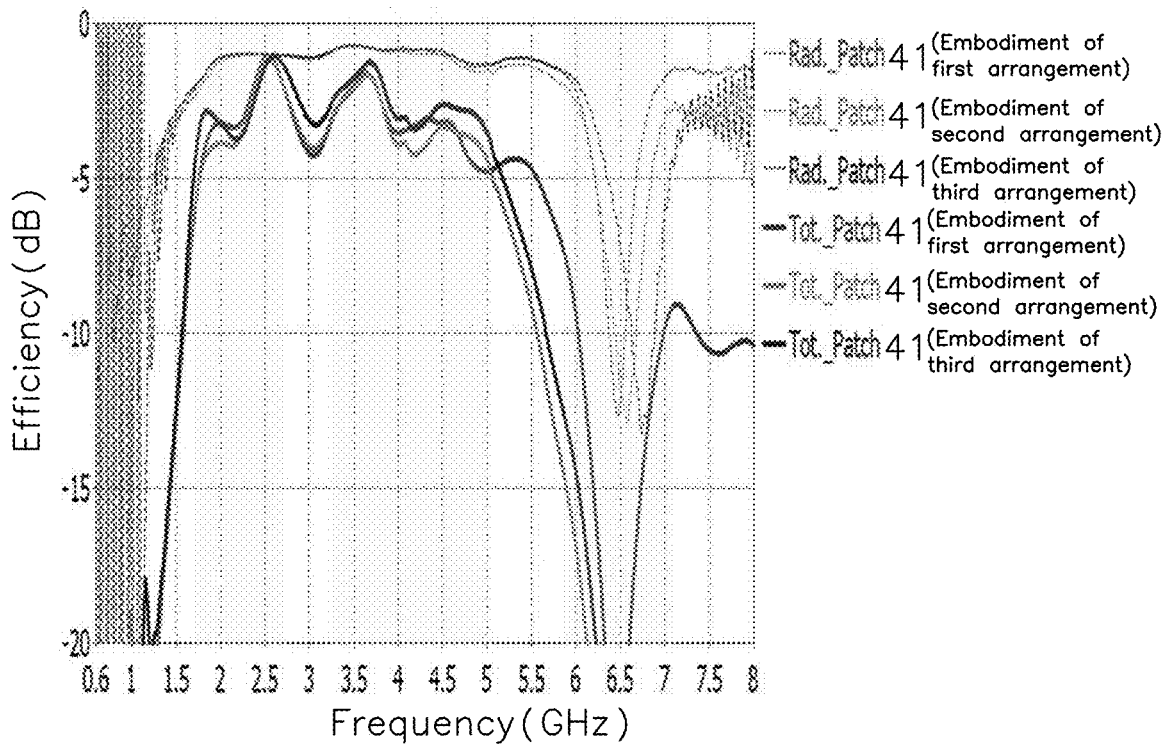
FIGS. 13A and 13B show efficiency graphs of the microminiaturized antenna feed module shown in FIGS. 4A, 5A, and 6A.

FIG. 13A shows efficiency graphs when the microminiaturized antenna feed module 400 uses the uses the first coupled feed portion Patch 41 in the first arrangement embodiment as shown in FIGS. 4A to 4C, and for the second arrangement embodiment as shown in FIGS. 5A to 5C, and for the third arrangement embodiment as shown in FIGS. 6A to 6C, coupling to the metal frame 5304 for radiating wireless signals. FIG. 13A shows the radiation efficiency (Rad. shown in the figure) and total efficiency (Tot. shown in the figure) values when the microminiaturized antenna feed module 400 uses the first coupled feed portion Patch 41 and the second coupled feed portion Patch 42 arranged on the first surface 4111 as shown in FIGS. 4A to 4C; the second coupled feed portion Patch 42 arranged on the first surface 4111, and the first coupled feed portion Patch 41 arranged internally to the first surface 4111 as shown in FIGS. 5A to 5C; the first coupled feed portion Patch 41 arranged on the first surface 4111, and the second coupled feed portion Patch 42 arranged internally to the first surface 4111 as shown in FIGS. 6A to 6C, coupling to the metal frame 5304 for radiating wireless signals.

Figure 13B:
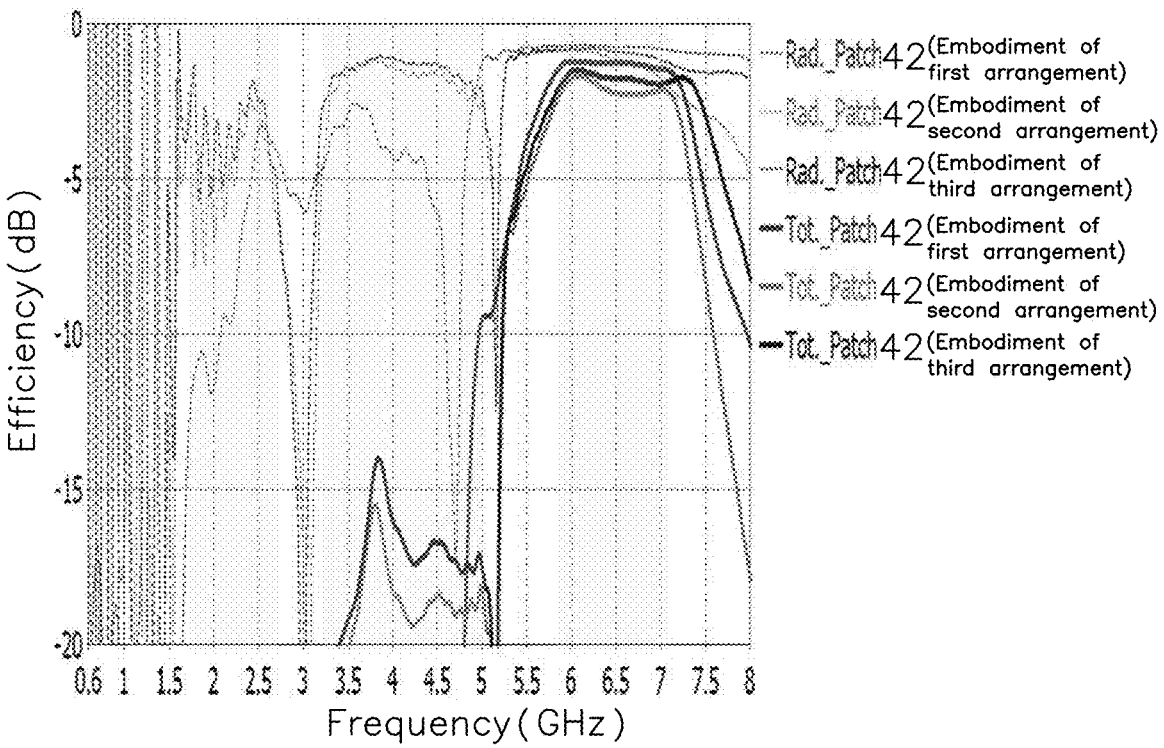

FIG. 13B shows an efficiency graph when the microminiaturized antenna feed module 400 uses the uses the second coupled feed portion Patch 42 in the first arrangement embodiment as shown in FIGS. 4A to 4C, in the second arrangement embodiment as shown in FIGS. 5A to 5C, and in the third arrangement embodiment as shown in FIGS. 6A to 6C, coupling to the metal frame 5304 for radiating wireless signals. FIG. 13B shows the radiation efficiency (Rad. shown in the figure) and total efficiency (Tot. shown in the figure) values when the microminiaturized antenna feed module 400 uses the first coupled feed portion Patch 41 and the second coupled feed portion Patch 42 arranged on the first surface 4111 as shown in FIGS. 4A to 4C; the second coupled feed portion Patch 42 arranged on the first surface 4111, and the first coupled feed portion Patch 41 arranged internally to the first surface 4111 as shown in FIGS. 5A to 5C; the first coupled feed portion Patch 41 arranged on the first surface 4111, and the second coupled feed portion Patch 42 arranged internally to the first surface 4111 as shown in FIGS. 6A to 6C, coupling to the metal frame 5304 for radiating wireless signals.

The microminiaturized antenna feed module 400 sets the switch 4131 and causes the switch 4131 to engage different signal feed points, to control the frequency mode, and cover the middle frequency (1.71 GHz-2.17 GHz), the high frequency (2.3 GHz-2.69 GHz), UHF (3.4 GHz-3.8 GHz), GPS, Wi-Fi 2.4G, Wi-Fi 5G, and can support 5G Sub 6 N77/N78/N79, 5G Sub 7, Wi-Fi 6E frequency bands.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A microminiaturized antenna feed module applied in an electronic device having a metal frame, comprising:
a substrate defining a plurality of vias penetrating the substrate;
an active circuit disposed on a first surface of the substrate and configured to switch radiation modes; and
a plurality of coupled feed portions disposed on a second surface of the substrate and having different coupling areas;
wherein the second surface is opposite to the first surface, the plurality of coupled feed portions, made of conductive material, electrically connect to the active circuit through the plurality of vias to feed in electrical signals and the plurality of coupled feed portions couple the electrical signals to the metal frame to radiate wireless signals, an area allocation of the plurality of coupled feed portions is adjustable in proportion to a bandwidth requirement.

2. The microminiaturized antenna feed module according to claim 1, wherein the plurality of coupled feed portions are coplanar but not overlapped.

3. The microminiaturized antenna feed module according to claim 1, wherein the plurality of coupled feed portions are not coplanar but partially overlapped.

4. The microminiaturized antenna feed module according to claim 1, wherein a projection area of one of plurality of coupled feed portions on the substrate occupies over 40% of an area of the substrate, and a projection area of another one of the plurality of coupled feed portions on the substrate occupies less than 10% of the area of the substrate.

5. The microminiaturized antenna feed module according to claim 4, wherein a projection of the second coupled feed portion on the substrate and a projection of the third coupled feed portion on the substrate are not overlapped.

6. The microminiaturized antenna feed module according to claim 1, wherein the first surface faces the metal frame, a least one of the plurality of coupled feed portions is disposed on the first surface, and the active circuit and a connector are disposed on the second surface.

7. The microminiaturized antenna feed module according to claim 6, wherein the plurality of coupled feed portions comprises a first coupled feed portion and a second coupled feed portion, one of the first coupled feed portion and the second coupled feed portion is arranged on the first surface of the substrate, the other one of the first coupled feed portion and the second coupled feed portion is arranged inside the substrate and under the first surface.

8. The microminiaturized antenna feed module according to claim 1, wherein the active circuit comprises a switch and a plurality of adjustable elements, a frequency radiation mode of the microminiaturized antenna feed module is controlled by switching the switch to a corresponding adjustable element and a corresponding feed source, to generate a middle frequency band, a high frequency band, a ultra-high frequency band (UHB), a global positioning system (GPS) frequency band, a WI-FI 2.4G frequency band, a WI-FI 5G frequency band, a 5G Sub 6 NR frequency band, a 5G Sub 7 frequency band, and a WI-FI 6E frequency band.

9. An electronic device comprising:
a metal frame;
a microminiaturized antenna feed module spaced apart from the metal frame, comprising:
a substrate defining a plurality of vias penetrating the substrate;
an active circuit disposed on a first surface of the substrate and configured to switch radiation modes; and
a plurality of coupled feed portions disposed on a second surface of the substrate and having different coupling areas;

wherein the second surface is opposite to the first surface, the plurality of coupled feed portions, made of conductive material, electrically connect to the active circuit through the plurality of vias to feed in electrical signals and the plurality of coupled feed portions couple the electrical signals to the metal frame to radiate wireless signals, an area allocation of the plurality of coupled feed portions is adjustable in proportion to a bandwidth requirement.

10. The electronic device according to claim 9, wherein the plurality of coupled feed portions are coplanar but not overlapped.

11. The electronic device according to claim 9, wherein the plurality of coupled feed portions are not coplanar but partially overlapped.

12. The electronic device according to claim 9, wherein a projection area of one of the plurality of coupled feed portions on the substrate occupies over 40% of an area of the substrate, and a projection area of another one of the plurality of coupled feed portions on the substrate occupies less than 10% of the area of the substrate.

13. The electronic device according to claim 12, wherein a projection of the second coupled feed portion on the substrate and a projection of the third coupled feed portion on the substrate are not overlapped.

14. The electronic device according to claim 9, wherein the first surface faces the metal frame, one of the plurality of coupled feed portion is disposed on the first surface, and the active circuit and a connector are disposed on the second surface.

15. The electronic device according to claim 14, wherein the plurality of coupled feed portions comprises a first coupled feed portion and a second coupled feed portion, one of the first coupled feed portion and the second coupled feed portion is arranged on the first surface of the substrate, the other one of the first coupled feed portion and the second coupled feed portion is arranged inside the substrate and under the first surface.

16. The electronic device according to claim 9, wherein the active circuit comprises a switch and a plurality of adjustable elements, a frequency radiation mode of the microminiaturized antenna feed module is controlled by switching the switch to a corresponding adjustable element and a corresponding feed source, to generate a middle frequency band, a high frequency band, a ultra-high frequency band (UHB), a global positioning system (GPS) frequency band, a WI-FI 2.4G frequency band, a WI-FI 5G frequency band, a 5G Sub 6 NR frequency band, a 5G Sub 7 frequency band, and a WI-FI 6E frequency band.

17. The electronic device according to claim 9, wherein the metal frame defines at least one gap and is divided into a first part and a second part, the microminiaturized antenna feed module is arranged correspondingly to the at least one gap.

18. The electronic device according to claim 17, wherein the electronic device further comprises an electronic component spaced apart from the metal frame, the microminiaturized antenna feed module is disposed in a slit formed between the electronic component and the metal frame, and the plurality of coupled feed portions and the metal frame are spaced apart.

* * * * *